(12) United States Patent
Kim et al.

(10) Patent No.: US 9,065,277 B1
(45) Date of Patent: Jun. 23, 2015

(54) BATTERY BACKUP SYSTEM FOR UNINTERRUPTED POWER SUPPLY

(75) Inventors: Sangsun Kim, San Jose, CA (US); Pascal Kam, Union City, CA (US)

(73) Assignee: Google Inc., Mountain View, CA (US)

(*) Notice: Subject to any disclaimer, the term of this patent is extended or adjusted under 35 U.S.C. 154(b) by 603 days.

(21) Appl. No.: 13/407,960

(22) Filed: Feb. 29, 2012

(51) Int. Cl.
*H02J 7/00* (2006.01)
*H02J 9/00* (2006.01)
*H02J 5/00* (2006.01)

(52) U.S. Cl.
CPC .... *H02J 9/00* (2013.01); *H02J 5/00* (2013.01)

(58) Field of Classification Search
CPC ............. H02J 3/005; H02J 7/007; H02J 7/00; H02J 7/0065; H02J 5/00; H02J 9/00
USPC .................................................... 307/64, 66
See application file for complete search history.

(56) References Cited

U.S. PATENT DOCUMENTS

| 5,424,936 A | 6/1995 | Reddy |
| 6,605,879 B2 | 8/2003 | Wade et al. |
| 7,130,202 B2 | 10/2006 | Yang |
| 2005/0099750 A1* | 5/2005 | Takahashi et al. .............. 361/92 |
| 2010/0054002 A1 | 3/2010 | Lu et al. |

* cited by examiner

*Primary Examiner* — Carlos Amaya
(74) *Attorney, Agent, or Firm* — Fish & Richardson P.C.

(57) ABSTRACT

Methods and systems supply uninterrupted power to a load using a backup battery module. A driver circuit connects the load and the backup battery module such that the operational range of the load voltage is narrower than the operational range of the battery voltage. Different charging and discharging paths of the driver circuit may be used to limit the DC bus voltage to values lower than the battery voltage. The proposed systems and methods can increase power efficiency and decrease the cost of power supply and conversion operations.

20 Claims, 5 Drawing Sheets

BATTERY BACKUP SYSTEM FOR UNINTERRUPTED POWER SUPPLY

FIELD OF THE DISCLOSURE

The present disclosure relates generally to power supply systems, and more particularly to battery backup circuits in uninterruptible power supply (UPS) systems.

BACKGROUND

UPS systems provide reliable, uninterrupted electric power to loads when the main input power supply is disrupted. These systems are typically used to protect computer, storage, processing, telecommunication equipment and/or any other equipment where the interruption of power supply or deviation from regulated power supply specifications can cause disruption, data loss, or injuries.

In a common power architecture of a UPS system, a load is connected through a DC bus to both a main AC-DC power supply and a backup battery. The load is typically powered from the main AC-DC power supply, for example through mains power. If the AC power supply is disrupted, for example, because of a power outage, the load is switched to the backup battery, which ensures continuous power supply. As the backup battery releases its stored energy by discharge, the voltage of the DC bus may significantly drop compared to its value during supply of the AC power. This voltage drop may be amplified when the backup battery has a high discharge rate, such as with lead-acid or lithium-ion batteries. As a result, typical UPS architectures may require a wide operational range of the DC bus voltage, e.g., in the order of tens of Volts. Such a wide operational voltage range may lower the power efficiency and increase cost and complexity of the supply and conversion operations in the UPS system.

SUMMARY

Aspects of the invention may be used to supply uninterrupted power to a load. One aspect is directed to a backup power system for supplying power to a load. The system includes a DC bus coupled to the load, where the DC bus operates at a DC bus voltage having a first operational range. The system further includes a battery module for supplying backup power to the load, where the battery module operates at a battery voltage having a second operational range. The system further includes a driver circuit for controlling the battery module, where the battery module is coupled to the DC bus via the driver circuit, and where the first operational range of the DC bus voltage is narrower than the second operational range of the battery voltage.

Another aspect is directed to a method of operating a battery module in a backup power system configured to supply power to a load coupled to a DC bus, where the DC bus operates at a DC bus voltage having a first operational range and the battery module operates at a battery voltage having a second operational range. The method includes controlling the battery voltage using a driver circuit, where the battery module is coupled to the DC bus via the driver circuit, and where the first operational range of the DC bus voltage is narrower than the second operational range of the battery voltage.

Yet another aspect is directed to a backup power system for supplying power to a load. The system includes a DC bus coupled to the load, where the DC bus operates at a DC bus voltage and a battery module for supplying backup power to the load, where the battery module operates at a battery voltage. The system further includes a driver circuit for controlling the battery module using a first path during a charging period and a second path during a discharging period, where the battery module is coupled to the DC bus via the driver circuit. The driver circuit includes a charging current regulator operable to control a current for charging the battery module in a first portion of the charging period and to block the charging current from the second path during a second portion of the charging period. The driver circuit further includes a boost circuit for controlling the battery voltage in the second portion of the charging period by matching the battery voltage to a target voltage level that is higher than the DC bus voltage.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative implementations will now be described, including systems and methods for providing uninterrupted power supply. However, it will be understood by one of ordinary skill in the art that the systems and methods described herein may be adapted and modified as is appropriate and that the systems and methods described herein may be employed in other suitable implementations, and that such other additions and modifications will not depart from the scope thereof.

I. High-Level Power Architecture

Figure 1:
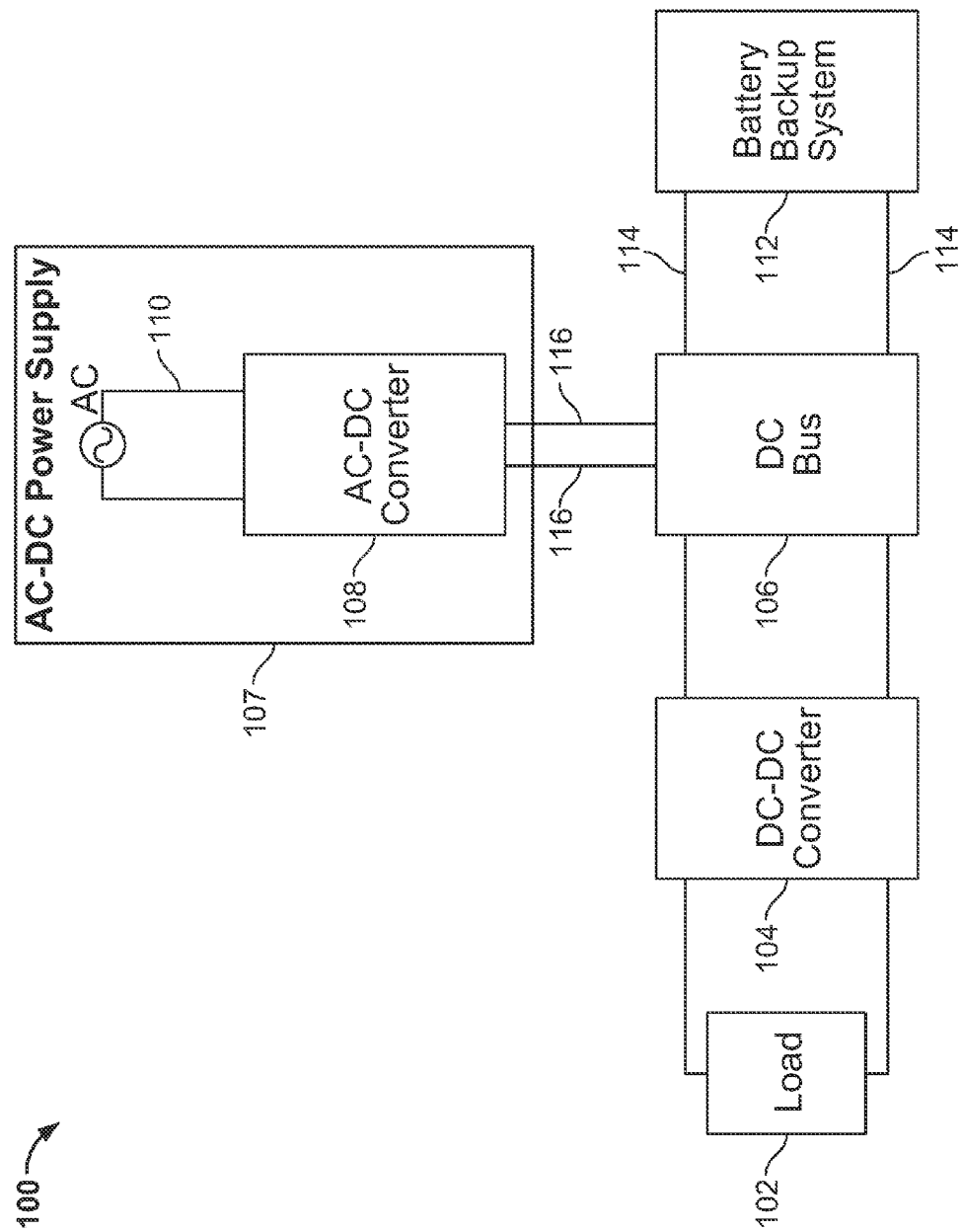
FIG. 1 shows a simplified block diagram of a UPS system according to some implementations.

FIG. 1 shows a simplified block diagram of a UPS system 100 according to some implementations. Power system 100 includes load 102, DC-DC converter 104, DC bus 106, AC-DC converter 108, AC power source 110, and battery backup system 112. Load 102 may include computer, storage, processing, telecommunication equipment and/or any other equipment for which uninterrupted power supply is desired.

Load 102 is connected to DC bus 106 through DC-DC converter 104. DC-DC converter 104 may convert the voltage of DC bus 106 from one voltage level to another as appropriate, for example, to meet the voltage specifications of load 102. When AC power is on, load 102 is powered from AC-DC power supply 107, which includes AC power source 110 and AC-DC converter 108. The AC power source 110 may correspond to AC power mains, an AC generator, and/or any other appropriate power supply. The AC power source 110 is converted to DC power using AC-DC converter 108. This AC-DC power is fed through AC-DC voltage line 116 to DC bus 106.

In the event of a disruption of the AC-DC power supply, for instance, because of power loss or deviation from regulated power specifications, supply to load 102 is switched to battery backup system 112 through backup voltage line 114. Battery backup system 112 may include one battery or a plurality of batteries arranged in a serial, parallel, and/or any appropriate configuration. For the purpose of illustration, the remaining description will refer to the one or more batteries of battery backup system 112 as a battery module having an associated battery voltage $V_{bat}$. It will be appreciated, however, that any number, battery configuration, and/or type of batteries may be included in this battery module.

When the AC power supply is restored after the power disruption, load 102 may be switched back to the AC-DC power line 116. In addition, the now depleted battery module in battery backup system 112 may be charged from AC source 110 through DC bus 106.

II. Battery Backup System Architecture

In some implementations, different charging and discharging paths may be used between the battery module and the DC bus such that the battery voltage is controlled to be higher than the DC bus voltage. As a result, the DC bus voltage may operate at a narrower range than the battery voltage. This may improve overall efficiency and reduce cost of operation of the UPS system. The separation of charging and discharging paths can also increase protection against system faults such as thermal runaways, short-circuits, and battery over and under voltage.

Figure 2:
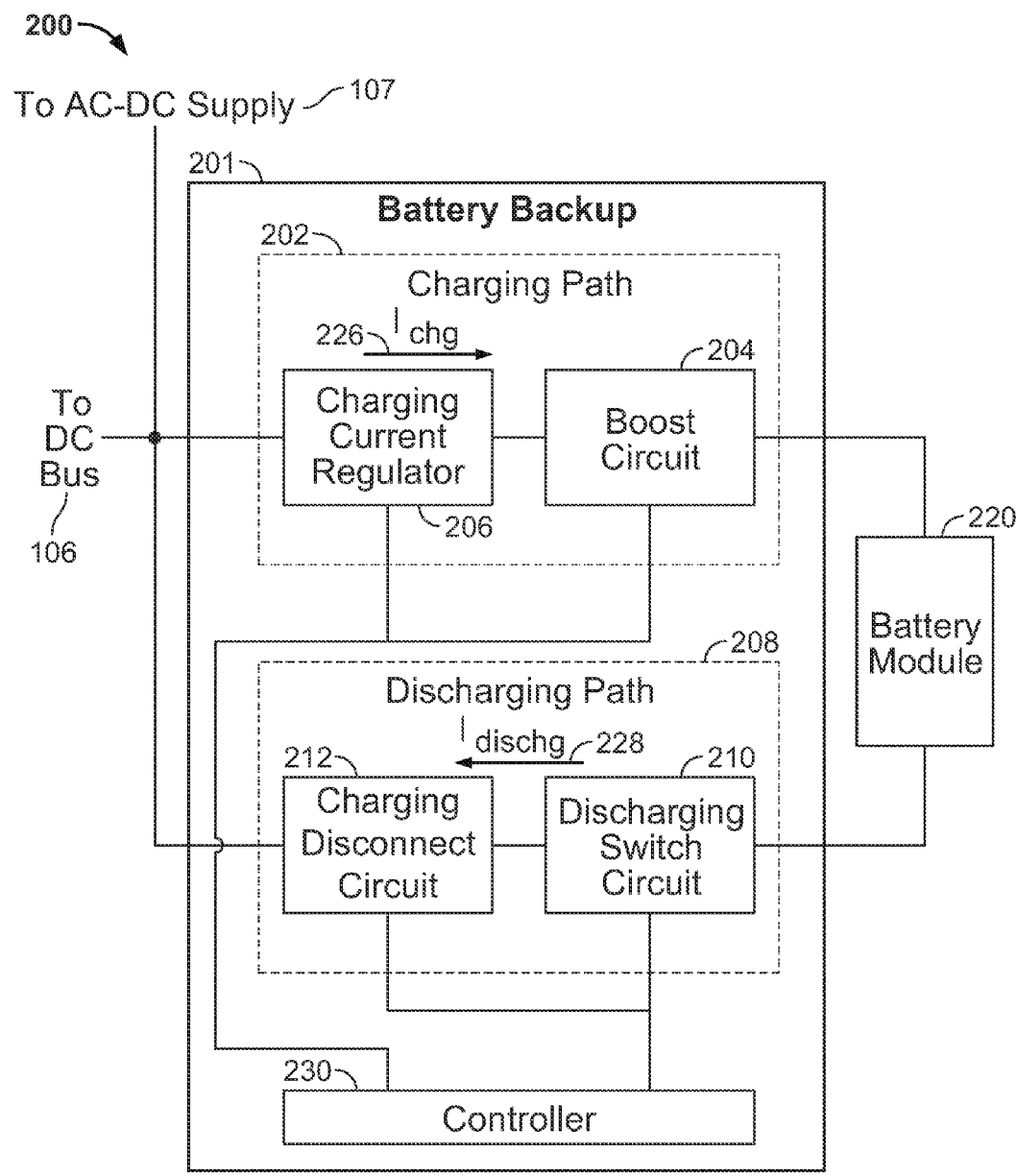
FIG. 2 shows a block diagram of an exemplary battery backup system in an exemplary UPS system, according to some implementations.

An exemplary implementation of battery backup system 112 with different charging and discharging paths is illustrated in FIG. 2 below. FIG. 2 shows a block diagram of battery backup system 200, according to some implementations. Battery backup system 200 includes driver circuit 201 and battery module 220. Driver circuit 201 includes charging path 202, discharging path 208, and optionally, controller 230.

When AC power is on, AC-DC power supply 107 generates charging current 226 which flows through charging path 202 to charge battery module 220. Components of charging path 202 operate to increase the battery voltage $V_{bat}$ from its discharge voltage level to a target voltage level, $V_{bat}^T$ that is higher than that of the voltage $V_{bus}$ across DC bus 106. This may be accomplished in two ways. First, charging current regulator 206 may increase the battery voltage $V_{bat}$ by regulating charging current 226. Specifically, charging current regulator 206 may be designed to provide a linear relationship between charging current 226 and $V_{bat}$, such that changing the charging current raises $V_{bat}$. Second, boost circuit 204 may increase the battery voltage $V_{bat}$ by matching the voltage $V_{bat}$ to a target voltage level.

The charging current or battery voltage regulating functions can be controlled by controller 230 which may activate or deactivate charging current regulator 206 and/or boost circuit 204, as described above. In addition, controller 230 may provide predetermined and/or dynamically adjusted target reference values for the voltage and charging current, such as $I_{ref}$ and $V_{bat}^T$. Alternatively, these control target values may be hardwired in charging current regulator 206 and/or boost circuit 204.

In the event of a disruption of AC power, the battery module provides power to load 102 through discharging path 208. Discharging current 228 is provided from battery module 220 through discharging path 208. Discharging path 208 includes discharging switch circuit 210 and charging disconnect circuit 212. Discharging switch circuit 210 may activate the discharging path during discharging of the battery module and deactivate the discharging path during charging of the battery module. Charging disconnect circuit 212 may block charging current 226 from entering the discharging path during charging and reduce the voltage drop across the charging disconnect circuit 212 during discharging. As with components of charging path 202, components of discharging path 208 may be controlled by controller 230. For example, controller 230 may signal to discharging switch circuit 210 and/or charging disconnect circuit 212 whether the battery is in charging or discharging mode.

The power architecture described herein may work with any type of battery. Because of the reduction in the operational range of $V_{bus}$ compared to that of the battery voltage $V_{bat}$, this arrangement may be used with batteries that have a high discharge rate such as lithium-ion batteries. These batteries have an operational voltage range that is wider than that of other commonly used types of batteries, such as lead-acid batteries.

III. Battery Backup System Implementation

Figure 3:
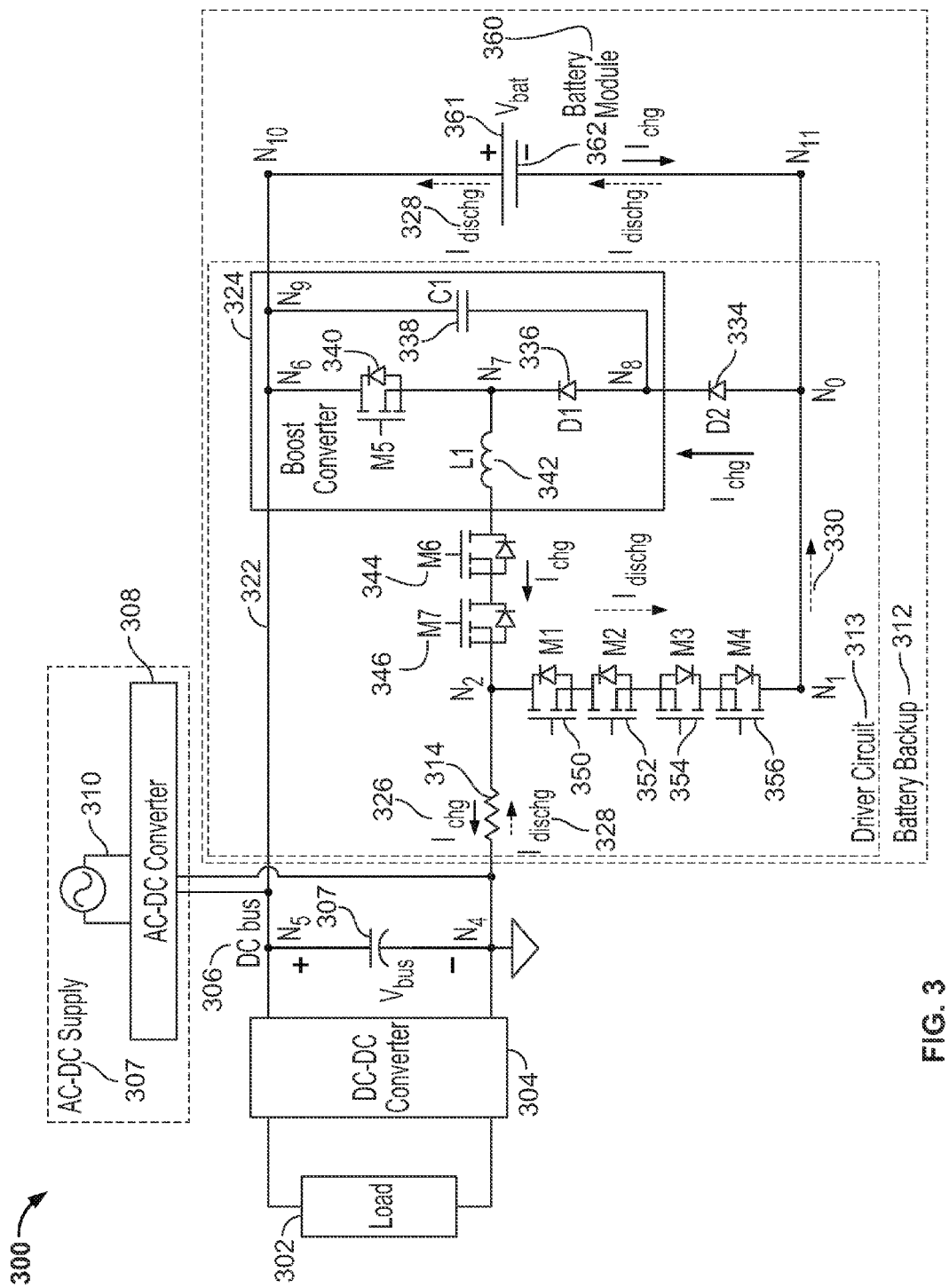
FIG. 3 shows a circuit diagram of an exemplary UPS system according to some implementations.

FIG. 3 shows a circuit diagram of an exemplary UPS system 300 according to some implementations. UPS system 300 includes load 302, DC-DC converter 304, DC bus 306, AC-DC converter 308, and AC power source 310. These components may be similar to load 102, DC-DC converter 104, DC bus 106, AC-DC converter 108, and AC power source 110 of FIG. 1, respectively. UPS system 300 also includes battery backup system 312, which has driver circuit 313 and battery module 360. Battery module 360 may be similar to battery module 220 of FIG. 2. Driver circuit 313 includes a shunt resistance 314, switches M1, M2, M3, M4, M6, and M7, diode D2, and boost converter circuit 324. Boost converter circuit 324 includes switch M5, inductance L1, diode D1, and capacitor C1. Capacitor C1 can reduce output voltage ripple during the operation of boost converter circuit 324. Similarly, capacitor 307 can reduce output voltage ripple across DC bus 306. Diode D2 is operable to isolate the battery from the capacitor C1 in case switches M1 through M7 are off.

Load 302 is connected to DC bus 306 through DC-DC converter 304. When AC power supply is on, load 302 is powered through AC-DC power supply 307 from the AC power source 310. In this case, the voltage across DC bus 306, $V_{bus}$, is maintained substantially at a target steady state voltage level $V_{bus}^T$. When the battery module 360 is fully charged (e.g., after AC power has been on for a long enough period or when a new battery module is installed), then the voltage across the battery module $V_{bat}$ is maintained substantially at a second target steady state voltage level $V_{bat}^T$. As will be described in further detail below, driver circuit 313 operates to decouple voltages across battery module 360 and DC bus 306, such that $V_{bus}^T$ may be lower than $V_{bat}^T$. In one example, when AC power is on, $V_{bat}$ may be kept at around 58 Volts and $V_{bus}$ may be kept at around 48 Volts.

When the power supply from AC power source 310 is disrupted, battery backup system 312 provides backup power to load 302 by discharging battery module 360. Battery module 360 provides discharging current 328, which flows from battery pole 362 to battery pole 361 in a discharging path along nodes N4, N2, N1, N0, N6, and N5, in that order. In this way, discharging current 328 passes through shunt resistor 314, switches M1, M2, M3, and M4, and the positive terminal of the DC bus 306. To accomplish this, switches M1 through M4 are activated, i.e., turned on, during discharge of the battery.

When the AC supply is restored, the DC bus voltage from the AC-DC converter 308 is provided to power the load and to charge battery module 360. During this charging period, battery module 360 is charged through charging current 326. Charging current 326 flows from the positive terminal of DC bus 306 in a charging path along nodes N5, N6, N10, N11, N0, N8, N7, N2, N4, or, alternatively, along nodes N5, N6, N7, N2, and N4, depending on the state of switch M5. In this way, charging current 326 flows through battery module 360, boost converter circuit 324, switches M6 and M7, and DC bus 306. During charging, switches M1, M2, M3, and M4 are deactivated, i.e., off. Alternatively, M3 and M4 may be used for charging the battery when the AC power is restored. In this case, M6 and/or M7 may be deactivated, i.e., turned off while M3 and M4 may be activated, i.e., turned on for charging. The operation of the various components of the charging and discharging paths will be described in further detail below.

Switches M1, M2, M3, and M4 correspond to discharging path 208 of FIG. 2. In particular, switches M1 and M2 correspond to discharging switch circuit 210 and switches M3 and M4 correspond to charging disconnect circuit 212 of FIG. 2. These switches of the discharging path 330 are activated during the discharging period and deactivated during at least a portion of the charging period of the battery module 360. In some implementations, switches M1, M2, M3, and M4 are activated when the bus voltage is lower than the normal bus voltage $V_{bus}^T$ and deactivated when a certain amount of charging current 326 flows after AC power is restored. In this way, M1, M2, M3, and M4 are activated in response to a disruption of AC power supply and deactivated in response to a restoration of the AC power supply. In some implementations, M1, M2, M3, and M4 are activated in response to a disruption of AC power supply and deactivated in response to detecting that the battery voltage has increased to a certain target voltage level, e.g., $V_{bus}^T$.

When the AC power supply is restored, $V_{bus}$ is restored to its steady state voltage level $V_{bus}^T$ through the AC-DC power supply 307. In addition, battery module 360 is charged and $V_{bat}$ is restored to its steady state voltage level $V_{bat}^T$ in two charging phases. In the first charging phase, $V_{bat}$ is increased by control of the charging current 326 until $V_{bat}$ reaches voltage level $V_{bus}^T$. In the second charging phase, $V_{bat}$ is increased by voltage regulation until $V_{bat}$ reaches voltage level $V_{bat}^T$. This is accomplished as follows.

In the first charging phase, while $V_{bat}$ is lower than $V_{bus}$, switches M6 and/or M7 can increase $V_{bat}$ from $V_{dischg}^T$ to $V_{bus}^T$ by regulating the charging current 326. For example, M6 or/and M7 may regulate charging current 326 to become less than a reference current level, $I_{ref}$. Reference current level $I_{ref}$ may be determined such that the proximity of the charging current to this reference current level $I_{ref}$ causes $V_{bat}$ to be close to $V_{bus}^T$. In one implementation, M6 and/or M7 may be implemented as power MOSFETs operating in their linear region during the first charging phase. In this way, as the charging current is regulated to match $I_{ref}$, $V_{bat}$ changes substantially linearly with the charging current. This process continues until $V_{bat}$ reaches the normal steady state bus voltage $V_{bus}^T$ to within a threshold of closeness and/or until the charging current is less than $I_{ref}$. In addition to current regulation, switches M6 and/or M7 provide protection. For example, M6 and/or M7 may operate to protect the discharging path from system faults such as overcharging, voltage surges, and/or thermal leakages.

In some implementations, switches M3 and/or M4, rather than, or in addition to switches M6 and M7, may implement the function of the charging current regulator. For example, in the first charging phase, while $V_{bat}$ is lower than $V_{bus}$, switches M3 and/or M4 may be used for increasing $V_{bat}$ from $V_{dischg}^T$ to $V_{bus}$ by regulating the charging current 326. For example, M3 or/and M4 may regulate charging current 326 to become less than a reference current level, $I_{ref}$. Reference current level $I_{ref}$ may be determined as described above, i.e., such that the proximity of the charging current to this reference current level $I_{ref}$ causes $V_{bat}$ to be close to $V_{bus}^T$. M3 and/or M4 may be implemented like M6 and/or M7, e.g., as power MOSFETs operating in their linear region during the first charging phase. In this way, as the charging current is regulated to match $I_{ref}$, $V_{bat}$ changes substantially linearly with the charging current. This process continues until $V_{bat}$ reaches the normal steady state bus voltage $V_{bus}^T$ to within a threshold of closeness and/or the charging current is less than $I_{ref}$. For example, M3 and/or M4 may be deactivated when the battery voltage is higher than the bus voltage. In this implementation, the switches of path 330, i.e., M1, M2, M3, and/or M4 may be activated during the discharging period and during the first charging phase, and deactivated during the second portion of the charging period.

In the second charging phase, where $V_{bat}$ exceeds $V_{bus}$, boost converter circuit 324 raises its output voltage, $V_{bat}$ to a higher level than its input voltage, $V_{bus}$. This is done using M5, which regulates charging current 326 and battery voltage $V_{bat}$. In particular, M5 operates to raise $V_{bat}$ to its target steady state voltage level $V_{bat}^T$ while limiting the charging current, e.g., to around $I_{ref}$. In the on-state, M5 is closed and charging current 326 flows through switch M5, resulting in an increase in the inductor current in L1. In the off-state, M5 is open, and the charging current (which is equal to the inductor current) flows through the battery module 360, capacitor C1 and diodes D2 and D1. As a result, the energy that was accumulated in inductor L1 during the on-state of M5 is transferred into the capacitor C1 and battery module 360 during the off-state of M5.

By alternating the on-state and the off-state for appropriate lengths of time, boost converter circuit 324 can control battery voltage $V_{bat}$. The longer the on-state of M5, the higher $V_{bat}$ is compared to $V_{bus}$. For example, defining duty cycle D as the fraction of the commutation period T during which the switch is on, D can be increased until $V_{bat}$ reaches the desired target level $V_{bat}^T$ above $V_{bus}$.

Although switches M1 through M7 are illustrated as MOSFETS in FIG. 3, any appropriate switch may be used. For example, M1 through M7 may be implemented using any appropriate type of switch, including but not limited to a transistor (e.g., IGBT or BJT) and/or a diode. In addition, although switches (M1, M2), (M3, M4), and (M6, M7) have been described in pairs above, it should be noted that any suitable number of switches can be used. In some implementations, only one of the two switches in each pair (M1, M2), (M3, M4), and/or (M6,M7) may be used, for example, to here no safety problems are raised. Alternatively, more switches may be used to provide additional protection. In addition, switches M3 and/or M4 may be replaced with a diode, which can provide the desired current blocking function while simplifying the control design. These aspects may be designed based, for example, on system requirements, complexity of control, and cost considerations.

One advantage of the UPS system described above may be a narrower operational range for the DC bus voltage as compared to conventional battery backup systems. This increases efficiency and decreases cost and complexity of the UPS system.

Figure 4:
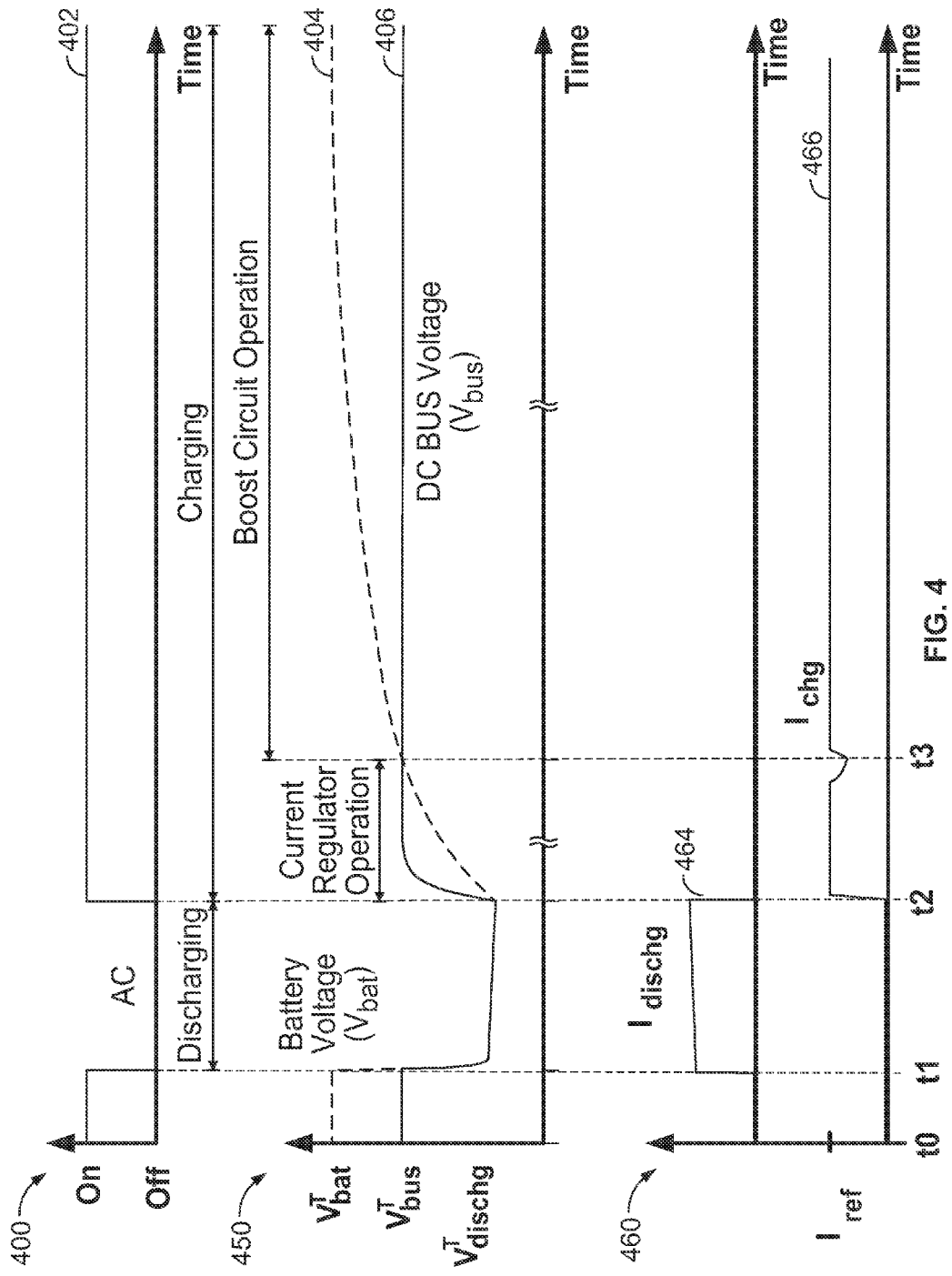
FIG. 4 illustrates operational voltage waveforms for AC-DC power supply voltage, battery voltage, and DC bus voltage under full load condition in an exemplary UPS system.

FIG. 4 illustrates the operational voltage waveforms for the AC power supply voltage, battery voltage $V_{bat}$, and DC bus voltage $V_{bus}$ under full load condition. Voltage waveform 402 represents the AC supply voltage, for example, as measured across AC power source 310 of FIG. 3. Voltage waveform 404 corresponds to $V_{bat}$, for example as measured across battery module 360 of FIG. 3. Voltage waveform 406 corresponds to $V_{bus}$, for example as measured across DC bus 306 of FIG. 3. Current waveform 464 measures the amplitude of the discharging current, e.g., discharging current 328 of FIG. 3. Current waveform 466 represents the amplitude of the charging current, e.g., charging current 326 of FIG. 3. The main AC power is disrupted at time $t_1$ and restored at $t_2$.

Between times $t_0$ and $t_1$, the AC power supply is on (waveform 402) and the load is powered through the main AC power supply using charging current $I_{chg}$. During this time, the battery is fully charged and, as a result, the charging current is close to zero (waveform 466). Under these conditions, $V_{bat}$ is set at a voltage level, $V_{bat}^T$, that is higher than the voltage level $V_{bus}^{Th}$ of $V_{bus}$. In one example, there may be a difference of about 10 Volts between $V_{bus}^T$ and $V_{bat}^T$.

At time $t_1$, the AC power is disrupted. As a result, the charging current drops to substantially zero and both $V_{bat}$ and $V_{bus}$ drop to a voltage level $V_{dischg}^T$ that is lower than $V_{bus}^T$ (and by transitivity, lower than $V_{bat}^T$). In some implementations, $V_{dischg}^T$ is variable depending on the load and backup time period. In one example, there may be a difference of about 5 Volts between $V_{bus}^T$ and $V_{dischg}^T$. The battery provides discharging current $I_{dischg}$, as can be seen from waveform 464. As the energy of the backup battery module gets depleted after the power disruption at $t_1$, $V_{bat}$ and $V_{bus}$ may continue to decrease as illustrated by the negative slope of their waveforms 404 and 406 between $t_1$ and $t_2$.

At time $t_2$, the AC power is restored. The voltage across $V_{bus}$ is quickly restored to its normal steady state voltage level $V_{bus}^T$ from the main AC power supply. The backup battery module is recharged in two charging phases. During the first charging phase, from $t_2$ to $t_3$, $V_{bat}$ increases due to the operation of the charging current regulator (e.g., current regulator 206 of FIG. 2 and switches M6 and M7 or switches M3 and M4 of FIG. 3). During this phase, the charging current is first restored to its pre-power interruption level ($I_{ref}$); the charging current is then controlled to be less than $I_{ref}$, as seen by the small current fall in waveform 466 immediately before $t_3$. In response to the charging current being less than $I_{ref}$ and/or to $V_{bat}$ exceeding threshold voltage level $V_{bus}^T$ at $t_3$, the second charging phase is performed using the boost circuit, e.g., boost circuit 204 of FIG. 2 or boost converter circuit 314 of FIG. 3. In this second phase, $V_{bat}$ continues to increase until it reaches $V_{bat}$. This increase may happen at a slower rate than during the first phase. In addition, the charging current is restored to the reference current level $I_{ref}$, as shown by the increase in the charging current of waveform 466 at $t_3$.

Although the beginning of the second charging, time $t_3$, is marked exactly at the intersection of waveforms 404 and 406, i.e., when $V_{bat}=V_{bus}=V_{bus}^T$, this need not be the case. The second charging phase may be started when the charging current is less than $I_{ref}$ and/or when $V_{bat}$ is within an appropriate degree of closeness to $V_{bus}$.

The following table summarizes the ranges of operation of $V_{bus}$ and $V_{bat}$ from FIG. 4 in the example where $V_{bat}^T$ is set to 58.4 Volts and $V_{bus}^T$ is set to 48 Volts. The operational range of $V_{bus}$ across both the charging and discharging modes is [43-48 Volts] while that of $V_{bat}$ is [43-58.4 Volts]. The described UPS system thus allows for an operational range of $V_{bus}$ that is narrower than that of $V_{bat}$ and for $V_{bus}$ to be lower than $V_{bat}$ when AC power is on. This increases the efficiency of the battery backup system.

TABLE 1

Operational Ranges of $V_{bus}$ and $V_{bat}$

| TIME | $t_0$-$t_1$ | $t_1$-$t_2$ | $t_2$-$t_3$ | After $t_3$ |
|---|---|---|---|---|
| AC power | ON | OFF | ON | ON |
| $V_{bus}$ | 48 | 48-43 | 48 | 48 |
| $V_{bat}$ | 58.4 | 58.4-43 | 43-48 | 48-58.4 |

Figure 5:
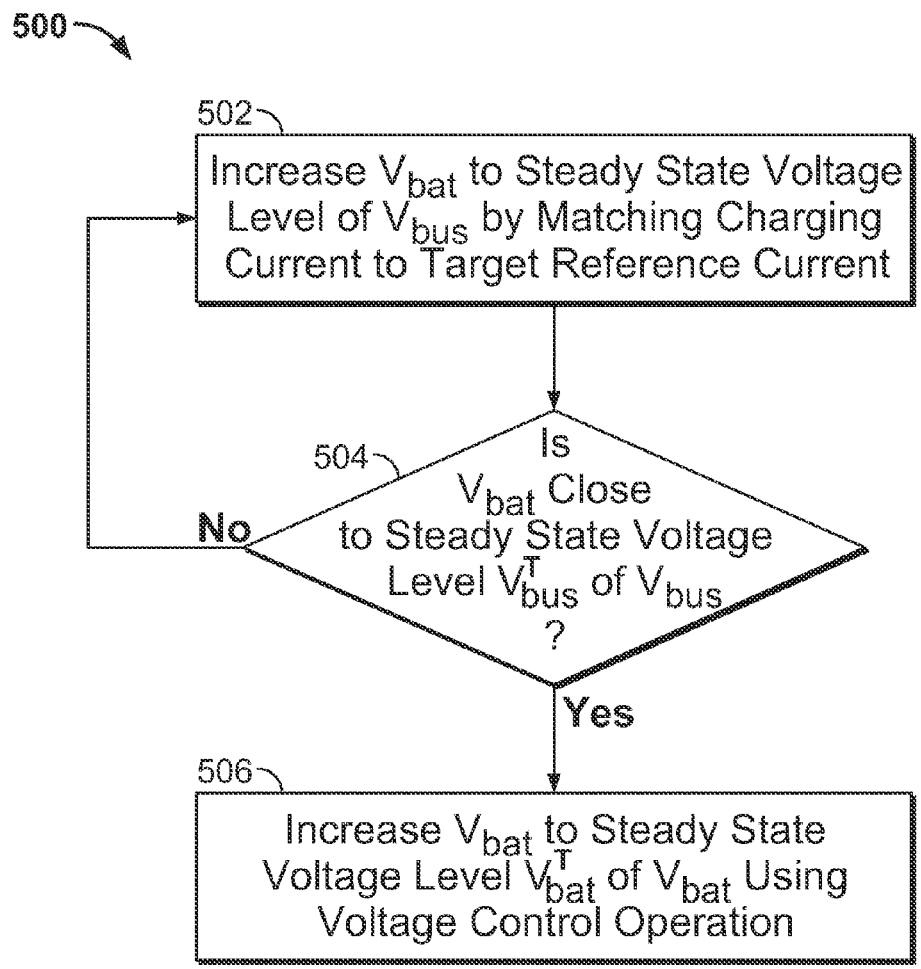
FIG. 5 is a flow chart showing an exemplary process for controlling charging operations in an exemplary UPS system, according to some implementations.

FIG. 5 is a flow chart showing an exemplary process 500 for controlling first and second charging phase operations in an exemplary UPS system according to some implementations. Process 500 may be implemented locally in control circuitries that are part of the battery backup system (e.g., in processing circuitry of charging current regulator 206 and/or boost circuit 204 of FIG. 2) or centrally (e.g., in processing circuitry which may or may not be part of the battery backup system 200 of FIG. 2).

At 502, $V_{bat}$ is increased to its target steady state voltage level, i.e., voltage level $V_{bus}^T$ using the current control circuitry described above. For example, the charging current of the backup battery module may be matched to a target reference current level $I_{ref}$ using switches M6 and/or M7 of FIG. 3. Alternatively, or in addition to using switches M6 and/or M7 of FIG. 3, increasing the battery voltage may be done using switches M3 and/or M4 of FIG. 3, as described above.

At 504, $V_{bat}$ is periodically checked against the voltage level $V_{bus}^T$. If the voltage is close enough to $V_{bus}^T$, then 506 is performed. Otherwise, $V_{bat}$ is increased again at 502 using the control circuitry.

At 506, $V_{bat}$ is increased to its own steady state voltage level, i.e., voltage level $V_{bat}^T$, using the voltage control circuitry described above. For example, $V_{bat}$ may be matched to the voltage level $V_{bat}^T$ using boost converter circuit of FIG. 3. The battery may be continuously charged up in this manner.

A number of implementations have been described. Nevertheless, it will be understood that various modifications may be made without departing from the spirit and scope of the disclosures in this document. For example, additional components may be added to those shown above, or components may be removed or rearranged. Also particular values for voltage levels and other such values may be varied. Moreover, while operations of process 500 are depicted in the drawings in a particular order, this should not be understood as requiring that such operations be performed in the particular order shown or in sequential order, or that all illustrated operations be performed, to achieve desirable results. In certain circumstances, parallel processing may be advantageous. Further, certain portions of the invention may be implemented as "logic" or a "component" that performs one or more functions. This logic may include hardware, such as an application specific integrated circuit or a field programmable switch array, software, or a combination of hardware and software.

What is claimed is:

1. A backup power system for supplying power to a load, the system comprising:
   a DC bus coupled to the load, wherein the DC bus operates at a DC bus voltage having a first operational range;
   a battery module for supplying backup power to the load, wherein the battery module operates at a battery voltage having a second operational range; and
   a driver circuit for controlling the battery module, wherein the battery module is coupled to the DC bus via the driver circuit, wherein the first operational range of the DC bus voltage is narrower than the second operational range of the battery voltage, and wherein the driver circuit comprises:
　a first path for charging the battery module during a charging period, the first path comprising:
　　a current regulator for regulating a current for charging the battery module in response to determining that the battery voltage is lower than the DC bus voltage; and
　　a boost circuit for increasing the battery voltage in response to determining that the battery voltage is higher than the DC bus voltage.

2. The backup power system of claim 1, wherein the DC bus is coupled to a primary power source comprising an AC-DC power supply, wherein the AC-DC power supply has an input configured to received AC mains power and an output configured to generate the DC bus voltage.

3. The backup power system of claim 1, wherein the DC bus is coupled to a primary power source other than the battery module and wherein the driver circuit comprises:
　a second path, different from the first path, for discharging the battery module during a discharging period, in response to determining that the primary power source is off, wherein the battery module is charged in response to determining that the primary power source is on.

4. The backup power system of claim 3, wherein the second path comprises:
　a charging disconnect circuit for reducing a voltage drop across the charging disconnect circuit during the discharging period; and
　at least one discharging switch, wherein the at least one discharging switch is on during the discharging period.

5. The backup power system of claim 1, wherein the current regulator is operable during a first portion of the charging period and the boost circuit is operable during a second portion of the charging period.

6. The backup power system of claim 1, wherein the boost circuit is operable to increase the battery voltage substantially above the DC bus voltage during the charging period.

7. The backup power system of claim 6, further comprising controller circuitry for controlling operation of the current regulator and the boost circuit, wherein the controlling comprises:
　matching, using the current regulator, the charging current to a target reference current until the battery voltage is determined to be within a closeness threshold to the DC bus voltage; and
　in response to determining that the battery voltage is within the closeness threshold to the DC bus voltage, matching, using the boost circuit, the battery voltage to a target reference voltage.

8. The backup power system of claim 1, wherein the boost circuit comprises a capacitor, the system further comprising a diode having an input coupled to the battery module and an output coupled to the capacitor, wherein the diode is operable to isolate the battery module from the capacitor.

9. The backup power system of claim 1, wherein the current regulator comprises one or two switches.

10. A method of operating a battery module in a backup power system configured to supply power to a load coupled to a DC bus, wherein the DC bus operates at a DC bus voltage having a first operational range and the battery module operates at a battery voltage having a second operational range, the method comprising:
　controlling the battery voltage using a driver circuit that couples the battery module to the DC bus, wherein the first operational range of the DC bus voltage is narrower than the second operational range of the battery voltage, wherein the DC bus is coupled to a primary power source other than the battery module, and wherein the controlling comprises:
　　controlling the battery voltage via a first path, wherein the first path is configured for charging the battery module during a charging period in response to determining that the primary power source is on, and wherein controlling the battery voltage via the first path comprises:
　　　regulating, using a current regulator, a current for charging the battery module in response to determining that the battery voltage is lower than the DC bus voltage; and
　　　increasing, using a boost circuit, the battery voltage in response to determining that the battery voltage is higher than the DC bus voltage; and
　　controlling the battery voltage using a second path, different from the first path, wherein the second path is configured for discharging the battery module during a discharging period in response to determining that the primary power source is off.

11. The method of claim 10, further comprising:
　during a first portion of the charging period, increasing the battery voltage, using the current regulator, until the battery voltage is close to the DC bus voltage; and
　during a second portion of the charging period, increasing the battery voltage substantially above the DC bus voltage using the boost circuit.

12. The method of claim 11, wherein the current regulator comprises at least one power MOSFET operating in its linear region during the first portion of the charging period.

13. The method of claim 10, wherein controlling the battery voltage via the first path comprises:
　matching, using the current regulator, the charging current to a target reference current until the battery voltage is determined to be within a closeness threshold to the DC bus voltage; and
　in response to determining that the battery voltage is within the closeness threshold to the DC bus voltage, matching, using the boost circuit, the battery voltage to a target reference voltage.

14. The method of claim 10, wherein the current regulator comprises a configurable number of power MOSFETs.

15. A backup power system for supplying power to a load, the system comprising:
　a DC bus coupled to the load, wherein the DC bus operates at a DC bus voltage;
　a battery module for supplying backup power to the load, wherein the battery module operates at a battery voltage; and
　a driver circuit for controlling the battery module using a first path during a charging period and a second path during a discharging period, wherein the battery module is coupled to the DC bus via the driver circuit, wherein the driver circuit comprises:
　　a charging current regulator operable to (i) control a current for charging the battery module in a first portion of the charging period and (ii) block the charging current from the second path during a second portion of the charging period; and
　　a boost circuit for controlling the battery voltage in the second portion of the charging period by matching the battery voltage to a target voltage level that is higher than the DC bus voltage.

16. The backup power system of claim 15, wherein the battery voltage is lower than the DC bus voltage in the first portion of the charging period, and wherein the battery voltage is higher than the DC bus voltage in the second portion of the charging period.

17. The backup power system of claim 15, further comprising a discharging switch circuit, wherein the discharging switch circuit is activated during the discharging period and during the second portion of the charging period, and wherein the discharging switch circuit is deactivated during the first portion of the charging period.

18. The backup power system of claim 17, wherein the battery module comprises at least one lithium-ion battery, and wherein an operational range of the DC bus voltage is narrower than an operational range of the battery voltage of the at least one lithium-ion battery.

19. The backup power system of claim 15, wherein the current regulator matches the current for charging the battery module to a target reference current until the battery voltage is determined to be within a closeness threshold to the DC bus voltage.

20. The backup power system of claim 19, wherein the boost converter matches the battery voltage to a target reference voltage in response to determining that the battery voltage is within the closeness threshold to the DC bus voltage.

* * * * *